United States Patent [19]

Cramer

[11] Patent Number: 4,773,207

[45] Date of Patent: Sep. 27, 1988

[54] ARRANGEMENT FOR REVERSE-STRANDING (SZ-STRANDING) OF AT LEAST ONE STRANDING ELEMENT OF A CABLE, IN PARTICULAR A STRANDING ELEMENT CONTAINING A BEAM WAVEGUIDE

[75] Inventor: Hugo Cramer, Cologne, Fed. Rep. of Germany

[73] Assignee: U.S. Philips Corporation, New York, N.Y.

[21] Appl. No.: 896,548

[22] Filed: Aug. 14, 1986

[30] Foreign Application Priority Data

Aug. 14, 1985 [DE] Fed. Rep. of Germany ....... 3529085

[51] Int. Cl.⁴ ......................... H01B 13/02; G02B 6/10
[52] U.S. Cl. ..................................... 57/294; 57/3; 57/6; 57/293; 57/314
[58] Field of Search ................... 57/3, 6, 293, 294, 314

[56] References Cited

U.S. PATENT DOCUMENTS

| | | | |
|---|---|---|---|
| 3,373,549 | 3/1968 | Shaw | 57/294 |
| 3,491,525 | 1/1970 | Sugi | 57/294 |
| 3,572,024 | 3/1971 | Lyons | 57/3 |
| 4,006,582 | 2/1977 | Gurkaynak et al. | 57/294 |
| 4,127,982 | 12/1978 | Braun et al. | 57/294 |
| 4,528,810 | 7/1985 | Vogelsberg | 57/294 |

FOREIGN PATENT DOCUMENTS 1928592 12/1970 Fed. Rep. of Germany .
2833699 2/1980 Fed. Rep. of Germany .
2855593 6/1980 Fed. Rep. of Germany .

*Primary Examiner*—John Petrakes
*Attorney, Agent, or Firm*—Ernestine C. Bartlett

[57] ABSTRACT

The invention relates to an arrangement for reverse-stranding (SZ-stranding) at least one stranding element of a cable, in particular a stranding element containing a beam waveguide, about a central element, a laying device being arranged between the oscillating lay plate and the fixed lay plate, which laying device takes up and pays out a lay of the stranding element at alternating periods, and comprises a stress controller for evening out the pull-off speed from the supply reel, which is arranged between the fixed lay plate and the supply reel. Also in the case of high pull-off speeds, the differences between pull-off forces are minimized and, in some cases, substantially eliminated, when the stress controller comprises a friction brake (14, 15, 16) arranged between the supply reel and the fixed lay plate (8) which engages the stranding element (1, 2), whose braking force is so controlled that it periodically shifts from minimum to maximum corresponding to the change in the supply length of the laying device.

13 Claims, 2 Drawing Sheets

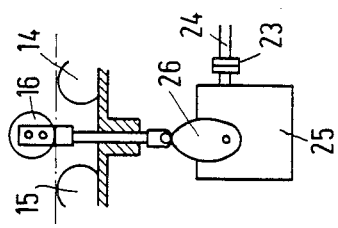
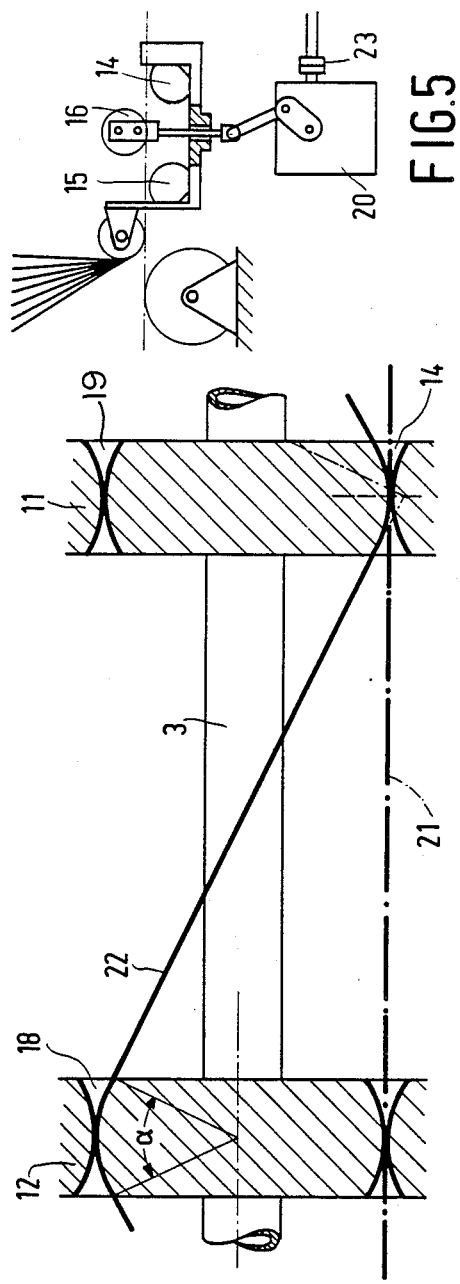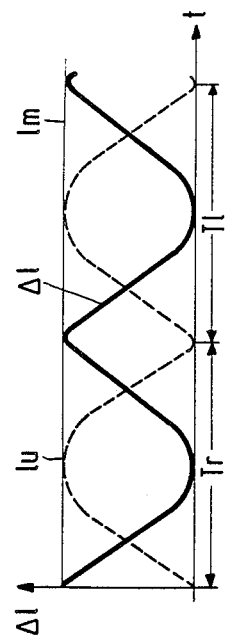

ARRANGEMENT FOR REVERSE-STRANDING (SZ-STRANDING) OF AT LEAST ONE STRANDING ELEMENT OF A CABLE, IN PARTICULAR A STRANDING ELEMENT CONTAINING A BEAM WAVEGUIDE

The invention relates to an arrangement for reverse-stranding (SZ-stranding) of at least one stranding element of a cable, in particular a stranding element containing an optical waveguide, about a central element, having a reversed-driven oscillating lay plate whose stranding element is provided around the central element, and having a fixed lay plate through which the stranding element is fed from a supply reel, a laying device being arranged between the oscillating lay plate and the fixed lay plate, which laying device takes up and pays out a lay of the stranding element at alternating periods, and comprising a stress controller for evening out the pull-off speed from the supply reel, which is arranged between the fixed lay plate and the supply reel.

BACKGROUND OF THE INVENTION

Such an arrangement is known from DE-PS No. 28 55 593. In said Patent Specification, wound-up stranding elements are drawn through cable passages in a fixed lay plate to an oscillating lay plate having a varying direction of rotation. Between the fixed lay plate and the oscillating lay plate the stranding elements extending about the central element in a right-hand turn are reversed into a left-hand turn via an almost straight layer. In this process, the stranding elements may be provided on a tube surrounding the central element. However, more suitable embodiments are those in which the turn is realized by a number of lay plates which are equally divided between the fixed lay plate and the oscillating lay plate and which are different, but driven at the same speed of rotation and in the same direction. In either embodiment there is between the fixed lay plate and the oscillating lay plate a lay of the stranding elements which changes from a maximum to a minimum at the frequency of the reversing frequency. Consequently, when the pull-off speed from the oscillating lay plate is constant the stranding elements pass through the fixed lay plate in a pulsating way. If the stranding elements were directly pulled off the supply reel, breaking forces would lead to high tensile loads of the stranding elements. This is precluded by the use of a stress controller which in the present case takes the form of a rotatably and movable roller which presses the stranding elements which are led over two spaced-apart fixed rollers down the interspace, in a perpendicular direction with respect to the pull-off direction, thus forming an additional slag which ideally must compensate the reduction in lay between the fixed lay plate and the oscillating lay plate.

It has been found, however, that in spite of an excellent length compensation changes in pull-off forces remain which form, through changes in the tensile load, intolerable loads to the susceptible stranding element of telecommunication cables and, in particular, to optical cables at the location of the stranding point.

SUMMARY OF THE INVENTION

It is an object of the invention to improve the arrangement mentioned in the opening paragraph, so that a high pull-off speeds of the stranding elements the smallest possible changes in pull-off forces occur.

The problem is solved by arranging between the supply reel and the fixed lay plate a friction brake which engages with the stranding element and whose braking force is controlled so that it changes periodically from a minimum value to a maximum value corresponding to the change in supply length of the laying device.

The invention is based on the recognition that despite length compensation, changes in pull-off forces remain which develop due to pulsations of varying frictional forces which inevitably affect the stranding elements located between the fixed lay plate and the oscillating lay plate. The solution provided by the present invention consists in complementing the minimum frictional forces by means of a friction brake which influences the stranding elements, so that the resulting frictional forces lead to an at least substantially constant pull-off force.

The simplest solution would be to lead the stranding element through two friction surfaces which are pressed together by a pulsatingly controlled force.

An advantageously simple solution is that the stress controller which also acts as a friction brake consists of rotatable rollers which lead the stranding element and can be moved with respect to each other, and whose interspace is periodically changed so that a periodically changing compensation length of the stranding element is compensated for, and a periodically changing braking force is applied to at least one of the rollers.

A preferred embodiment is characterized in that the stress controller which also acts as a friction brake consists of non-rotatable sliding elements which can be moved with respect to each other, and which guide the stranding element and periodically change from a substantially straight lay to a corrugated lay.

As the increase in friction caused by the wrap between the fixed lay plate and the oscillating lay plate corresponds to the increase of the lay, it is advantageous for a possibly total elimination of the time-dependent variation of the pull-off forces that the lay lengths of the stranding elements on the sliding elements steadily increase from minimum to maximum. In this way, the ideal situation is almost obtained in which the friction forces of the friction brake increase to the same extent as the friction forces between the fixed lay plate and the oscillating lay plate decrease.

When the displacement of the sliding elements with respect to each other is caused by a displacement drive which is driven by the reversing drive of the oscillating lay plate, the friction brake functions synchronously with the reversing frequency of the oscillating lay plate.

The invention will now be explained in more detail by means of the description of examples of embodiments shown in the drawing. The operation of the friction brake in accordance with the invention is described by way of example, in connection with an SZ-stranding device which exhibits lay plates between the fixed lay plate and the oscillating lay plate.

BRIEF DESCRIPTION OF THE DRAWINGS

FIG. 3 shows the course in time of the additional lay Δl and the compensation length lu.

FIG. 4 shows the run of a stranding element between two neighboring lay plates.

FIG. 5 shows a driving arrangement for a stress controller in accordance with the invention.

FIG. 6 shows a different driving arrangement.

DETAILED DESCRIPTION OF THE PREFERRED EMBODIMENTS

Figure 1:
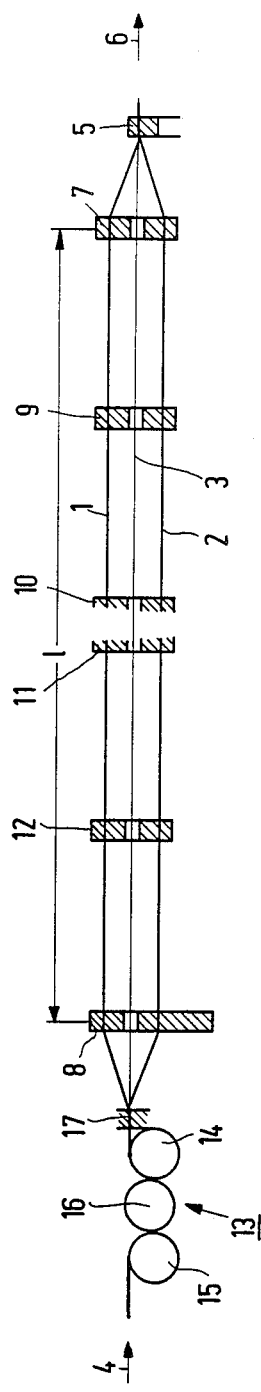
FIG. 1 shows the principal arrangement of the essential elements of an arrangement in accordance with the invention when the stranding elements are led in a straight line between the fixed lay plate and the oscillating lay plate.
Figure 2:
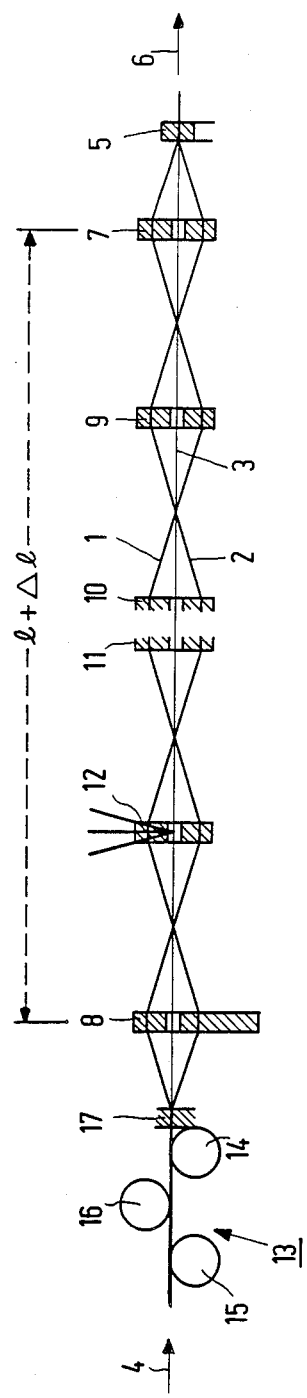
FIG. 2 shows the arrangement in accordance with FIG. 1 when the wrap of the stranding elements is maximum.

Out of a possible multitude of stranding elements FIGS. 1 and 2 only show two, 1 and 2, which can be twisted about a central element 3. These elements are pulled off supply reels which are not shown at the location and in the direction indicated by the arrow 4. A pull-off device which is not shown either pulls off at a constant rate the central element with the stranded-on stranding elements through the fixed stranding nipple 5 in the direction of the arrow 6. In this process, the oscillating lay plate is driven alternatingly in a right-hand and a left-hand direction through the same angle of twist or, as the case may be, is turned through an equal number of rotations so that a reversed lay stranding is obtained. Between the oscillating lay plate 7 and the fixed, non-rotating lay plate 8 a wrap of the central element 3 by the stranding elements 1 and 2 will compulsorily take place as shown in FIG. 2 at a time when a reversal will follow. FIG. 1, however, represents the situation at a point in time exactly between two reversing operations, in which the stranding elements 1 and 2 run straight and parallel to the central element 3, so that their length between the fixed lay plate 8 and the oscillating lay plate 7 corresponds to the minimum length l. When the oscillating lay plate 7 is rotated further an additional lay Δl is formed. At the time of reversal in accordance with FIG. 2, the maximum length l+Δl of the stranding elements 1 and 2 is formed between the fixed lay plate 8 and the oscillating lay plate 7.

FIG. 3 shows the curve of the additional lay Δl as a function of time t. In FIG. 3, $T_r$ is the duration of, for example, the right-hand twist of the oscillating lay plate, whilst $T_l$ is the duration of the twist in the opposite direction. When the maximum values of Δl are obtained the reversal of the oscillating lay plate in accordance with FIG. 2 takes place, whilst when Δl=0 the stranding elements start to run a straight line, in accordance with FIG. 1.

The lay plates 9, 10, 11, 12 which are driven in a rigid coupling with the rotation of the oscillating lay plate 7 in the direction of the fixed lay plate 8 and at a gradually reducing rate provide in a known manner a controlled wrapping process.

In order to keep the speed of the stranding elements substantially constant at the location of the arrow 4, a stress controller 13 has been provided. Between the fixed elongated guiding members 14 and 15 and the elongated displacement body 16 which can be moved in a perpendicular direction with respect to the pull-off direction, the stranding element 1 and 2 are led, next to each other, to and through holes drilled in a guiding rail 17. When, as in the case shown in FIG. 2, at the time of reversal the maximum lay l+Δl between the fixed lay plate 8 and the oscillating lay plate 7 is formed in the stranding field, the displacement body 16 is in such a position with respect to the guiding members 14 and 15 that the stranding elements will immediately start to run in a straight line. When, as shown in FIG. 1, the stranding elements 1 and 2 are led into the stranding field without wrap, the displacement body 16 will lead them between the guiding bodies 14 and 15. The length lu of the deviation (compensation length) is equal to the maximum lay l+Δl formed in the stranding field, in accordance with FIG. 2.

The displacement of the displacement body 16 is coupled rigidly to the reversing movement of the oscillating lay plate 7, so that the length of the deviation lu has the shape of the time-dependent curve represented in FIG. 3 by a dotted line. The total . . . Δl and lu is constant (lm) so that the stranding elements 1 and 2 are pulled off the supply reels at a constant speed.

When the guiding members 14, 15 and the displacement body 16 are designed in accordance with the present state of the art, i.e. as freely rotatable rollers which run on bearings, the pull-off force from the supply reels is constant. However, when the tensile load influencing the stranding elements between the oscillating lay plate 7 and the stranding nipple 5 was measured, it could be established that the tensile load pulsates substantially at the frequency of the reversing frequency. The longitudinal forces in the stranding elements change temporarily in the same way and in phase with the lay Δl in accordance with FIG. 3. The reason for this is that the difference in length of the wraps in the stranding field will also bring about different frictional forces, as is explained in more detail with reference to FIG. 4. FIG. 4 represents a lay field between two neighboring lay plates 11 and 12 on a larger scale than in FIGS. 1 and 2 and with only one stranding element. The course of the stranding element is drawn in a dot-and-dash pattern in position 21 in accordance with FIG. 1 and in solid line in position 22 in accordance with FIG. 2. A stranding element in position 21 will run through each lay field almost without any friction. When the neighbouring lay plates 11 and 12 are rotated with respect to each other up to the extreme position at the time of reversal (in the present example almost 180°), a continuously increasing frictional force is formed. The lay length on the guidance apertures 18 and 19 of the lay plates 11 and 12 increases continuously up to an angle α. Up to position 22 the stranding elements are pressed onto these lay surfaces with a continuously increasing force, so that a pulsating frictional force acts upon the stranding elements, which is at a minimum in position 21 and at a maximum in position 22.

In order to make sure that in the stranding nipple 5 substantially constant longitudinal forces act upon the stranding elements, which is extremely necessary when the stranding elements contain beam wave guides, steps are taken in accordance with the invention, which bring about additional frictional forces so that the overall friction is almost constant.

A very simple solution consists in so designing the guiding members 14 and 15 and the displacement body 16 that they cannot be rotated, consequently, the stranding elements 1 and 2 are led under friction and exhibit an increasing wrap from the minimum position in accordance with FIG. 2 to the maximum position as shown in FIG. 1. In order to obtain a time-dependent, substantially compensating course (comparable to lu relative Δl in accordance with FIG. 3), the displacement body 16 may at the most be introduced so far between the guiding members 14 and 15 that it is in one plane with the said members. The maximum value of the compensating friction of the stress controller 13 can be made to match the maximum value of the pulsating friction in the stranding field, due to, in particular, the number of guiding members, the displacement body and their diameters and friction values.

The guiding members 14 and 15 and displacement body 16 can easily be manufactured in the form of rotationally symmetrical cylinders in which successive circumferential ribs for guiding the stranding elements are provided in an axial direction. As a matter of fact, any number of stranding elements can be guided in the manner described.

In order to obtain a compensation in proper phase, the displacement body 16 must be driven, rigidly coupled, simultaneously with the reversing rotation of the oscillating lay plate 7. In the embodiment in accordance with FIG. 5, the displacement of the displacement body 16 is carried out by means of a crank drive 20 which is rigidly coupled to the drive device for the oscillating lay plate 7.

In very difficult cases a disk cam mechanism 25 in accordance with FIG. 6 can be used. The contours of the cam disc 26 can be selected so that the time-dependent course of the friction pulsations within the stranding field and the compensating friction through the controller 13 are completely negatively congruent, i.e. so that the curve lu according to FIG. 3 corresponds exactly to the inverse of curve Δl. Under these circumstances lu+Δl=lm=so that the stranding elements are pulled off the supply reels at a constant speed. The curves lu and Δl change over the same time period, however, in substantially reverse values so that variations in frictional forces are substantially eliminated. These values of lu and Δl will not be exactly negatively congruent, however, unless the cam disc 26 is precisely dimensioned and configured or unless other means for obtaining precision in these values are provided. The driving mechanisms shown in FIGS. 5 and 6 are advantageous examples of preferred embodiments. When necessary, other driving mechanisms for example, a crank drive mechanism having a driving mechanism with a constant direction of rotation or electronically controlled driving mechanisms may be employed.

The invention has been explained by means of an example of a SZ-stranding device having lay plates. However, analogous conditions are also found with different, known SZ-stranding arrangements, for example, when laying the wrap around a tube within the stranding field. Consequently, the compensation in accordance with the invention can be applied advantageously and in the same way to variations in length and friction of all types of SZ-stranding arrangements.

What is claimed is:

1. An arrangement for reverse-stranding of at least one stranding element of a cable about a central element, having a reverse-driven oscillating lay plate whose stranding element is provided around the central element, and having a fixed lay plate through which the stranding element is fed from a supply reel, a laying device being arranged between the oscillating lay plate and the fixed lay plate, which laying device takes up and pays out a lay of the stranding element at alternating periods, and comprising a stress controller for evening out the pull-off speed from the supply reel, characterized in that said stress controller comprises a friction brake (14, 15, 16) arranged between the supply reel and the fixed lay plate (8), which engages the stranding element (1, 2) and whose braking force is controlled so that it changes periodically from a minimum value to a maximum value corresponding to the change in the supply length of the laying device.

2. An arrangement as claimed in claim 1, characterized in that said friction brake consists of rollers which guide the stranding element and which can be moved and rotated with respect to each other, the interspace between the said rollers being periodically changed so that a periodically changing length of the stranding element (1, 2) is compensated for, and at least one of the rollers is subjected to a periodically changing braking force.

3. An arrangement as claimed in claim 1, characterized in that said friction brake consists of mutually movable, non-rotatable guide members (14, 15, 16) which slide relative to each other and which guide the stranding element (1, 2) and periodically change the stranding element being fed to the fixed lay plate from a substantially straight lay to a corrugated lay.

4. An arrangement as claimed in claim 3, characterized in that the stranding elements (1, 2) are in contact with the guide members over a distance which gradually increases from a minimum to the maximum.

5. An arrangement as claimed in claim 3 or 4, characterized in that towards the stranding elements the guide members have curved guiding surfaces.

6. An arrangement as claimed in claim 3, characterized in that the guiding surfaces are cylindrical.

7. An arrangement as claimed in claim 3, 4 or 6 characterized in that the displacement of the guide members with respect to one another is brought about by a drive (23, 25) which is driven by the reversing drive of the oscillating lay plate (7).

8. An arrangement for reverse stranding at least one stranding element about a central element which comprises:
   a reverse-driven oscillating lay plate through which the stranding element is pulled-off to a storage device;
   a fixed lay plate through which the stranding element is fed from a supply reel;
   a laying device arranged between the oscillating lay plate and the fixed lay plate which takes up and pays out a lay of the stranding element at alternating periods to periodically change its supply length; and
   a stress controller arranged between the supply reel and the fixed lay plate and comprising members displaceable with respect to each other wherein said displaceable members engage the stranding element and effect a periodically changing braking force which corresponds substantially to the periodically changing supply length of the laying device.

9. An arrangement as claimed in claim 8 wherein said stranding element contains an optical waveguide and said stress controller comprises a friction brake which consists of displaceable rollers which guide the stranding element.

10. An arrangement as claimed in claim 9 which includes a displacement drive for said rollers driven by the reversing drive of the oscillating lay plate.

11. An arrangement as claimed in claim 8 wherein said stranding element contains an optical waveguide and said stress controller comprises a friction brake which consists of non-rotatable guide members which slide relative to each other and which periodically change the stranding element being fed to the fixed lay plate from a substantially straight lay to a corrugated lay.

12. An arrangement as claimed in claim 11 which includes a displacement drive for said guide members driven by the reversing drive of the oscillating lay plate.

13. An arrangement as claimed in claim 8 which includes a displacement drive for said displaceable members driven by the reversing drive of the oscillating lay plate.

* * * * *